United States Patent Office 3,458,971
Patented Aug. 5, 1969

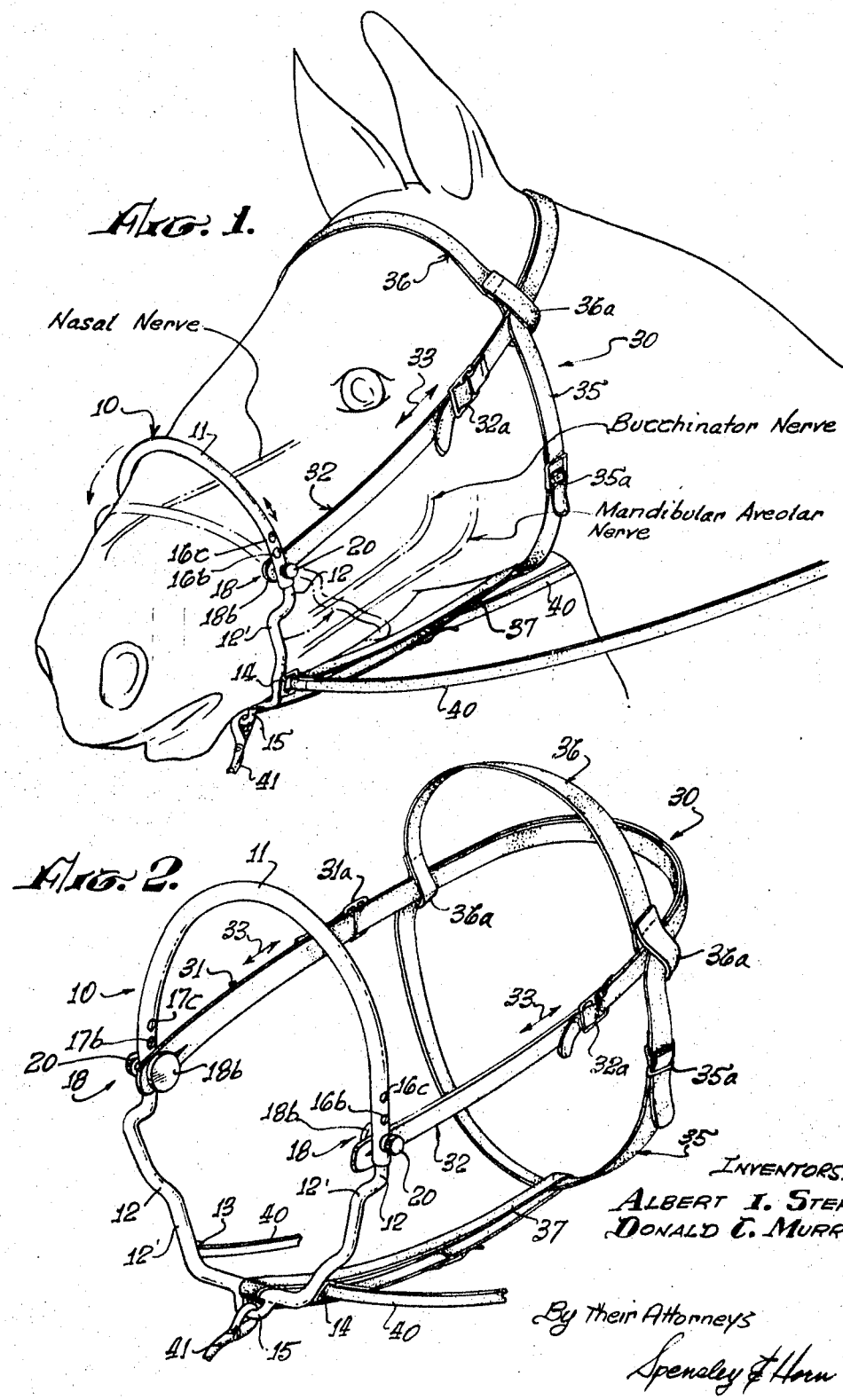

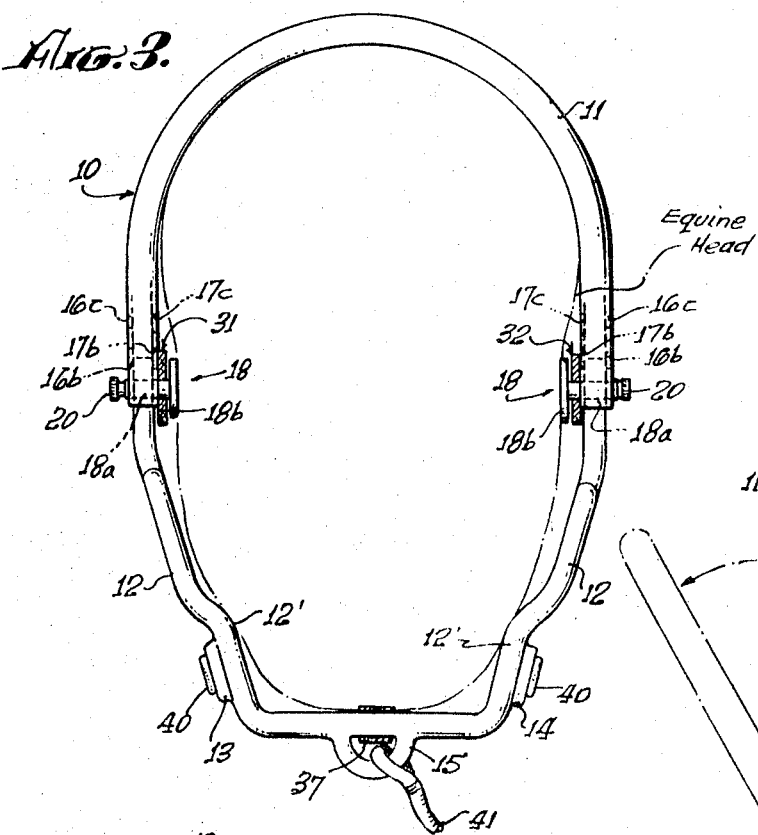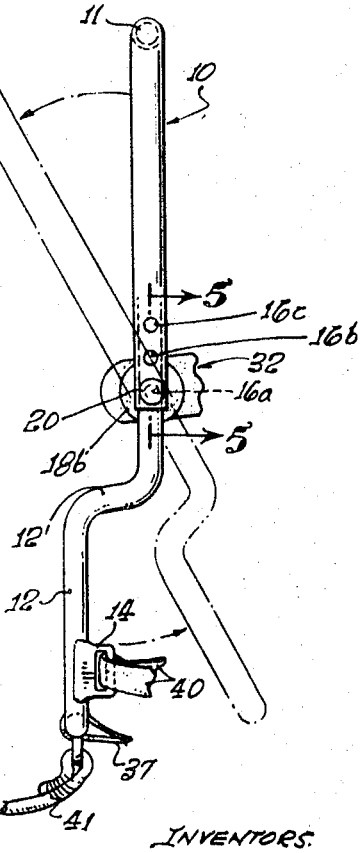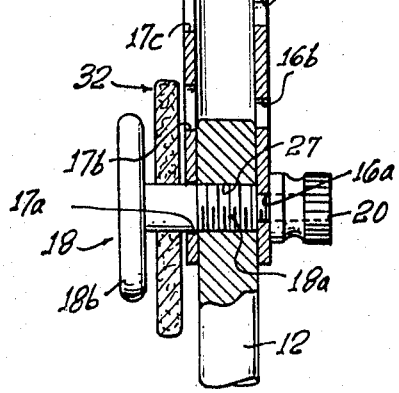

---

3,458,971
HORSE TRAINING DEVICE
Albert I. Stern and Donald C. Murray, Sun Valley, Calif., assignors to Albert I. Stern, Sun Valley, Calif.
Filed Dec. 15, 1966, Ser. No. 601,971
Int. Cl. B68b 1/04, 1/08
U.S. Cl. 54—6     9 Claims This invention relates to rein operated horse controlling devices and, more particularly, to such a device having the general appearance of a halter type bridle but operating primarily by the application of nerve pressures rather than physical head moving forces.

In the usual halter or hackamore type of bridle, as well as the bit type of bridle, horse control is achieved through the use of physically applied forces which constrain movement of the horse's head so that the horse will react in a desired manner. However, there are two distinct disadvantages of this conventional technique for horse control. First, in order to sustain a desired horse action it is necessary, with all but well trained animals, to maintain the horse's head in a reaction producing attitude by the continuous application of sufficient force to prevent reaction by head movement, thereby causing reaction by a body movement. Second, the attitude in which the horse's head is held during control is usually an unnatural one, thereby reducing the efficiency of the animal's response. For example, manipulation of the reins in a conventional bit bridle system while executing a right turn causes the horse's nose to be tilted to the left, whereas an unbridled horse's nose points in the direction of a turn. During training of a horse it is frequently necessary for the handler to use relatively strong forces in order to control the horse, since the horse is usually reacting against unnatural movements. The present invention is directed toward an improved horse controlling and training device which alleviates the aforementioned disadvantages of conventional bridle systems.

Accordingly, it is an object of the present invention to provide improved rein operated horse controlling and training apparatus.

It is also an object of the present invention to provide improved apparatus of the character described which requires the use of less physical force to achieve desired control.

It is another object of the present invention to provide improved apparatus of the character described which results in an increase in the efficiency of the animal's response.

It is a further object of the present invention to provide improved apparatus of the character described wherein control is achieved by constraining movement of the horse's head in a more natural manner.

It is yet another object of the present invention to provide a more versatile rein operated horse controlling and training apparatus.

It is a still further object of the present invention to provide improved horse controlling and training apparatus operable by the momentary application of slight pressures instead of the continuous application of strong physical force.

It is also an object of the present invention to provide more humane apparatus of the character described.

It is another object of the present invention to provide an improved horse controlling apparatus for more quickly and easily training a horse.

The objects of the present invention are accomplished by a rigid control member in the form of an irregularly shaped band which encircles the horse's muzzle, the control member being pivotally secured to the ends of cheek straps in the general vicinity usually occupied by the noseband of a headstall. However, unlike the usual noseband the control member functions to selectively apply pressure to specific nerves in the horse's face in response to manipulation of the reins. To achieve this end the control member is contoured so that its upper portion will be in intimate contact with the face contiguous with the nasal nerve, and so that its lower portion will be in intimate contact with the lower jaw contiguous with certain of the mandibular nerves. In accordance with rein manipulation, the control member will be pivotally moved to exert pressure on different sensitive areas to elicit different responses.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a pictorial representation of the present invention control device mounted on a horse's head;

FIGURE 2 is a perspective view of the control device;

FIGURE 3 is a front elevation view of the control member of the device;

FIGURE 4 is a side elevation view of the control device, including an indication of its rotation to another operating position; and FIGURE 5 is an enlarged view taken along the line 5—5 of FIGURE 4.

Turning now to the drawing, in FIGURE 2 there is shown an illustrative embodiment of the present invention horse controlling apparatus. The main operational component of the apparatus is a control member, generally indicated by the reference numeral 10. The control member 10 is shown pivotally mounted to the ends of cheek straps 31 and 32 of a headstall generally indicated by the reference numeral 30. Each or only one of the cheek straps 31 and 32 has an adjustable means 31a and 32a for adjusting the size of the device in the direction of arrows 33. The adjustable means 31a and 32a may take the form of buckles, eyelet adjacent member 20, other adjustable connectors of the incremental or infinite variety. The headstall also includes a loop which defines throatlatch 35 and a browband 36. The browband 36 is a separate member which passes in front of the horse's ears over the brow and terminates in a loop or pair of loops 36a. The throatlatch 35 is also a separate member which passes behind the horse's ears and then through loop 36a and under the horse's head adjacent its neck. The throatlatch may include an adjustable means 35a. An adjustable leather strap 37 extends from the throat latch 35 to the control member portion of eyelet 15. The device is operated by an operating means such as reins 40 or a longe line rope 41.

The control member 10 is in the form of a rigid band comprising an upper or nose engaging section 11 and a lower or chin engaging section 12. The member 10 can be of unitary construction or, as in the illustrated embodiment, upper and lower sections 11 and 12 can be separate pieces which are rigidly interconnected.

FIGURE 3 of the drawing illustrates the presently preferred construction and interconnection of the upper and lower sections, the upper section 11 being of tubular cross section and the lower section 12 being of smaller cross section for insertion into the upper section 11. The upper section 11 can conveniently be fabricated from aluminum tubing, which can be bent into a desired curved configuration yet is sufficiently rigid for normal use in the device. The lower section 12, however, is of an irregular shape and more sharply curved, hence it is preferred to fabricate this section with a solid rather than tubular configuration. In the illustrated embodiment the section 12 is in the form of a casting, having integral rein eyelets 13 and 14, and a longe line and eyelet 15. The materials and techniques utilized in the construction of the control member, together with the techniques for attaching the reins and strap thereto, are not critical and many suitable alternatives will be readily apparent to those skilled in the art.

FIGURE 5 of the drawing illustrates a presently preferred structure for the adjustable interconnection of the upper and lower sections 11 and 12. The outwardly facing tubular wall surfaces of the nose engaging section 11 are provided at their lower ends with a series of holes 16a, 16b and 16c, their corresponding inwardly facing wall surfaces being provided with larger diameter holes 17a, 17b and 17c. The projecting upper ends of the chin engaging section 12 are provided with transverse holes 27 of a diameter corresponding to that of the holes 17.

A pair of inserts or thumbscrew means 18, each having an internally threaded portion 18a projecting from a broad area cap portion 18b are provided for the dual purpose of pivotally mounting the control member to the cheek straps and for adjustably interconnecting the control member sections 11 and 12. The diameter of the rod portions 18b is approximately equal to, but slightly less than, the diameter of the holes 17 and 27. To assemble the device for use the lower section 12 is pushed into the upper section 11 until the hole 27 is in alignment with selected ones of the holes 17a, 17b or 17c, the particular hole 17 being selected in accordance with the size and configuration of the horse's head. The rod end 18a of the screw 18 is inserted through a suitable slit or eyelet hole near the bottom end of the cheek strap of the headgear, thence through the aligned holes 17 and 27 of the control member. The assemblage is secured by inserting the threaded portion of a cap screw 20 through the appropriate hole 16 and then screwed into the threads of the rod portion 18a of the insert 18. The ends of reins 40 are secured to the eyelets 13 and 14, and the strap 37 is looped through the eyelet 15, thereby resulting in the assembled device configuration shown in FIGURE 2. The plurality of holes 16 along with adjustable means 31a and 32a enable the device to be fitted to horses with various head sizes and configurations.

When the controlling device is mounted on a horse's head, the control member will assume a normal rest position as indicated by the solid line portions of FIGURE 1, in the absence of any pressure on the reins. A hard tug on the reins 40 will cause rotation of the control member about the insert 18 to a tilted position indicated by the dotted line portions of FIGURES 1 and 4. The amount of pressure exerted on the reins is directly related to the amount of pressure exerted by the control device on the horse's nerves. The size and shape of the control member sections are most clearly shown in FIGURES 2–4, the contouring of the control member being such that specific portions of the control member are brought into intimate contact with sensitive areas of the horse's nose and jaws wherein certain nerve endings are close to the skin surface.

More specifically, the nose engaging section 11 is contoured to work on the posterior nasal nerves of the horse which pass through the sphenopalatine foramen, this control member section bearing on one or more minute ganglia which divide into the medial and lateral branches. The chin engaging section 12 is contoured so that in its full pressure applying position it will exert contact on the mandibular alveolar nerve, this nerve being extremely sensitive as it rises with the lingual by a common trunk which passes forward on the lateral pterygoid muscle, this nerve also affecting the anterior belly of the digastricus and the skin of the anterior part of the mandibular space. The contour of the lower section 12 is also such that when the control member is rotated to its fullest extent (as indicated by the dotted line portions of FIGURE 1) it will exert pressure not only on the rear portion of the mandibular alveolar nerve but also on the buccinator nerve. As the buccinator nerve passes downward and forward across the medial surface of the temporary-mandibular articulation, it also passes through the anterior part of the lateral pterygoid muscle. The chin engaging section 12 exerts force through the buccinator nerve forward in the submucus tissue of the cheek along the ventral border of the depresser labii inferioris which divides into branches that ramify in the mucus membrane and glands of the lips in the vicinity of the commissure. These branches also supply smaller branches to the lateral pterygoid and temporal muscles and to the buccal glands.

The nasal, buccinator, and mandibular alveolar nerves are indicated in FIGURE 1 of the drawing. The nerve ending of the nasal nerve is quite close to the skin on the forward portion of the muzzle. Pressure will be applied on this sensitive nerve ending by the nose engaging section 11 when it is rotated to the dashed line position, hereinafter called the full pressure applying position. The nose engaging section 11 is smoothly curved, substantially planar, and sized to fit the general contour of a horse's nose so that the upper portion will bear on the skin area over the nasal nerve. The major portion of the chin engaging section 12 is offset from the nose engaging section 11 so that it will be positioned adjacent the mandibular alveolar nerve ending when the control member is in its rest position and adjacent the buccinator nerve ending and mandibular alveolar when the control member is rotated to the full pressure applying position. The chin engaging section 12 is contoured at each of its sides to define an inward step 12' so that these inwardly stepped portions will be contiguous with the mandibular alveolar and buccinator nerves during rotation of the control member.

In operation, and with no pressure exerted on the reins 40, the control member will be in the solid line position shown in FIGURE 1, there being no significant pressure applied to the horse's nerves in this position. A slight tug on the reins will pull the lower end of the chin engaging section 12 rearwardly and upwardly thereby pivoting the control member about the inserts 18 and causing the stepped portions 12' to rub along the jaw skin area contiguous with the mandibular alveolar nerve and the buccinator. Slight irritation of this nerve will cause the horse to raise his head to escape from or relieve this irritation. Thus, a light backward pressure on the reins will result in a raising of the horse's head, this being the correct head attitude for proper balance during a stop. Therefore, when desiring a quick stop, a series of short pulls on the reins will provide a suggestion of force sufficient to make the horse raise his head and allow him to keep it raised during the stop. This is in contrast to the ordinary bridle system wherein a continuous physical force is usually applied to pull the horse's head back and hold it down in order to make a stop. A greater suggestion of force is available by pulling the reins directly rearwardly with greater force to bring the chin engaging section 12 into play against the buccinator nerve as well as the alveolar nerve.

If it is desired to make the horse lower his head, such as in a backing maneuver, for example, the reins are pulled downwardly and rearwardly to rotate the control member while pulling it downwardly to bring the nose engaging portion into rubbing contact to play upon the nasal nerves. Upon an application of pressure to the nasal nerves the horse lowers his head in an attempt to relieve or escape from the irritation. Rotation of the control member to its full pressure applying position while pulling downwardly on the reins brings the nose engaging section 11 into contact with the horse's nose at the point where the nerve contact is most acute. This mode of operation is ideally suited for the training of a horse, the pressure being released after each backward step by momentary relaxation of the reins, a subsequent tug on the reins again giving the suggestion of force which causes the horse to tuck his head.

An additional advantage of the present invention control member is that it provides automatic head positioning during turning maneuvers, thereby enabling faster reining and easier turns. In order to make the horse turn to the right, for example, a tug is exerted on the right rein while allowing some slack in the left rein. This tends to cause lateral rotation of the rigid control member 10 so that the control member presses on the left side of the horse's face, whereupon the horse will turn his head to the right, the tightened right hand rein also pulling his head to the right. This is in direct contrast to the operation of a bit type of bridle wherein lateral movement of the reins to the right results in the unnatural tilting of the horse's nose to the left. The operation of the present invention device automatically positions the horse's head in a nautral attitude for turning.

Thus, there has been described a novel horse controlling and training device which is more humane and efficient than ordinary bridle apparatus, and enables the handler to use less force in all aspects of controlling the horse. Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. In a bitless bridle, the combination comprising a supporting head gear including cheek straps, a rigid noseband pivotally mounted to the lower ends of said cheek straps for controlled rotation to positions intermediate a normal rest position and a full pressure applying position in response to operating means manipulation, said rigid noseband defining a nose engaging portion above the pivotal mounting and a chin engaging portion below the pivotal mounting, said chin engaging the portion having an irregular shape such that said portion comes in direct contact with the horse's chin when said bridle is in said intermediate and full pressure positions, said chin engaging portion including operating means.

2. The device defined in claim 1, wherein said nose engaging portion is smoothly curved and substantially planar, and wherein said chin engaging portion is offset from said nose engaging portion.

3. The device defined in claim 1, wherein said chin engaging portion is so shaped that, when said device is mounted on a horse's head, said chin engaging portion will apply pressure to the horse's mandibular alveolar nerve as said rigid noseband is rotated from said rest position to said full pressure applying position.

4. The device defined in claim 3, wherein said nose engaging portion is of a predetermined contour so that, when said device is mounted on a horse's head, said nose engaging portion will apply pressure to the horse's posterior nasal nerves as said rigid noseband is rotated from said rest position to said full pressure applying position.

5. The device defined in claim 3, wherein the predetermined contour of said chin engaging portion is such that said chin engaging portion will also apply pressure to the horse's buccinator nerve when said rigid noseband is rotated to said full pressure applying position.

6. A control member for a horse's headgear, comprising:
   (a) a rigid band sized to fit onto a horse's muzzle, said band defining a smoothly curved substantially planar nose engaging portion and an underlying irregularly shaped chin engaging portion offset from said nose engaging portion and directly contactable with the horse's lower jaw;
   (b) means for rotatably mounting said rigid headband to the lower ends of cheek straps of a headstall with the axis of rotation extending transversely through said band; and,
   (c) means for attaching operating means to said chin engaging portion.

7. The control member defined in claim 6, wherein said chin engaging portion is contoured for intimate contact with the horse's lower jaw contiguous with the mandibular alveolar nerve for the application of pressure to said nerve upon rotation of said control member when mounted to the horse's head.

8. The control member defined in claim 7, wherein said nose engaging portions is contoured for intimate contact with the horse's nose contiguous with the posterior nasal nerves for the application of pressure to said nerves upon rotation of said control member when mounted on the horse's head.

9. The control member defined in claim 8, wherein said chin engaging portion is also contoured for intimate contact with the horse's lower jaw contiguous with the buccinator nerve for the application of pressure to this nerve upon rotation of said control member when mounted on the horse's head.

References Cited

UNITED STATES PATENTS

| | | | |
|---|---|---|---|
| 826,810 | 7/1906 | Udhaug | 54—6 |
| 2,597,736 | 5/1952 | Jones | 54—6 |
| 2,854,800 | 10/1958 | Strawhorn et al. | 54—6 |
| 3,149,448 | 9/1964 | Smith | 54—6 |
| 3,237,374 | 3/1966 | Irion | 54—15 |

OTHER REFERENCES

Saddlelog Catalogue #75 1965, Tex Tan Western Leather Company, Yoakum, Texas, page 83 relied upon.

ALDRICH F. MEDBERY, Primary Examiner

U.S. Cl. X. R.

54—15